United States Patent [19]

Eisen et al.

[11] Patent Number: 4,964,077
[45] Date of Patent: Oct. 16, 1990

[54] METHOD FOR AUTOMATICALLY ADJUSTING HELP INFORMATION DISPLAYED IN AN ONLINE INTERACTIVE SYSTEM

[75] Inventors: Ivan R. Eisen, Flower Mound; Ruth A. Morris, Dallas, both of Tex.

[73] Assignee: International Business Machines Corporation, Armonk, N.Y.

[21] Appl. No.: 104,922

[22] Filed: Oct. 6, 1987

[51] Int. Cl.$^5$ .............................................. G06F 3/14
[52] U.S. Cl. .................................. 364/900; 364/948.2;
364/948.22; 364/948.1; 364/419; 434/118
[58] Field of Search ... 364/419, 410, 411, 200 MS File,
364/900 MS File; 273/1 E, DIG. 28; 434/118, 335

[56] References Cited

U.S. PATENT DOCUMENTS

| | | | |
|---|---|---|---|
| 4,500,964 | 2/1985 | Nickle | 364/300 |
| 4,648,062 | 3/1987 | Johnson et al. | 364/900 |
| 4,657,247 | 4/1987 | Okada | 273/1 E |
| 4,679,789 | 7/1987 | Okada | 273/1 E |
| 4,685,677 | 8/1987 | Demar et al. | 273/1 E X |
| 4,712,180 | 12/1987 | Fujiyama et al. | 364/419 |
| 4,731,735 | 3/1988 | Bogendale et al. | 364/200 |
| 4,754,326 | 6/1988 | Kram et al. | 364/900 |
| 4,775,935 | 10/1988 | Yourick | 364/401 |
| 4,800,485 | 1/1989 | Ackroff et al. | 364/200 |

OTHER PUBLICATIONS

Naiman, "Introduction to Word Star", SYBEX, Inc., 1982, pp. 10, 35–42.
Bonney, "The Word Star Customizing Guide", Wordware Publishing, 1980, p. 60.
Barr, "Electric Pencil", PC Magazine, vol. 6, No. 4, pp. 134–135, 2/24/1987.
Kellerman et al., "Adaptive Computer-Assisted Instruction", IBM TDB, vol. 21, No. 3, Aug. 1978, pp. 990–991.

*Primary Examiner*—Thomas C. Lee
*Attorney, Agent, or Firm*—Whitham & Marhoefer

[57] ABSTRACT

An improvement is disclosed to the conventional field related help/dialog facility in an interactive data entry data processing system. The improvement comprises a technique for tracking the number of times a user has invoked a help/dialog function, comparing that number to a threshold value and then displaying less help/dialog information to the user from that point on. Additionally, the application tracks the number of elapsed days since a functional area has been used. Once the number of elapsed days reaches a threshold, the user is reset to a status in which all the help/dialog information is once again displayed. This is accomplished by building a data base of help/dialogs which are uniquely addressed by the functional area and skill level of the individual user.

7 Claims, 3 Drawing Sheets

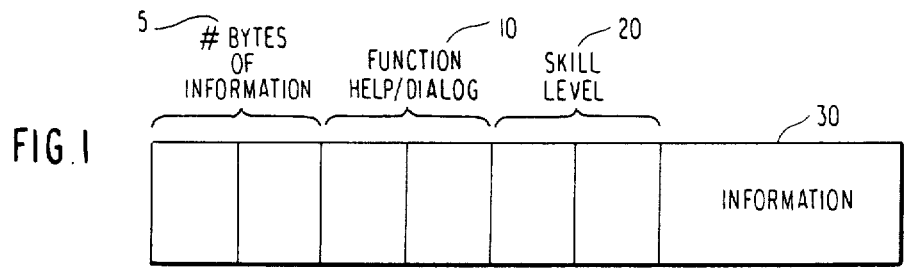
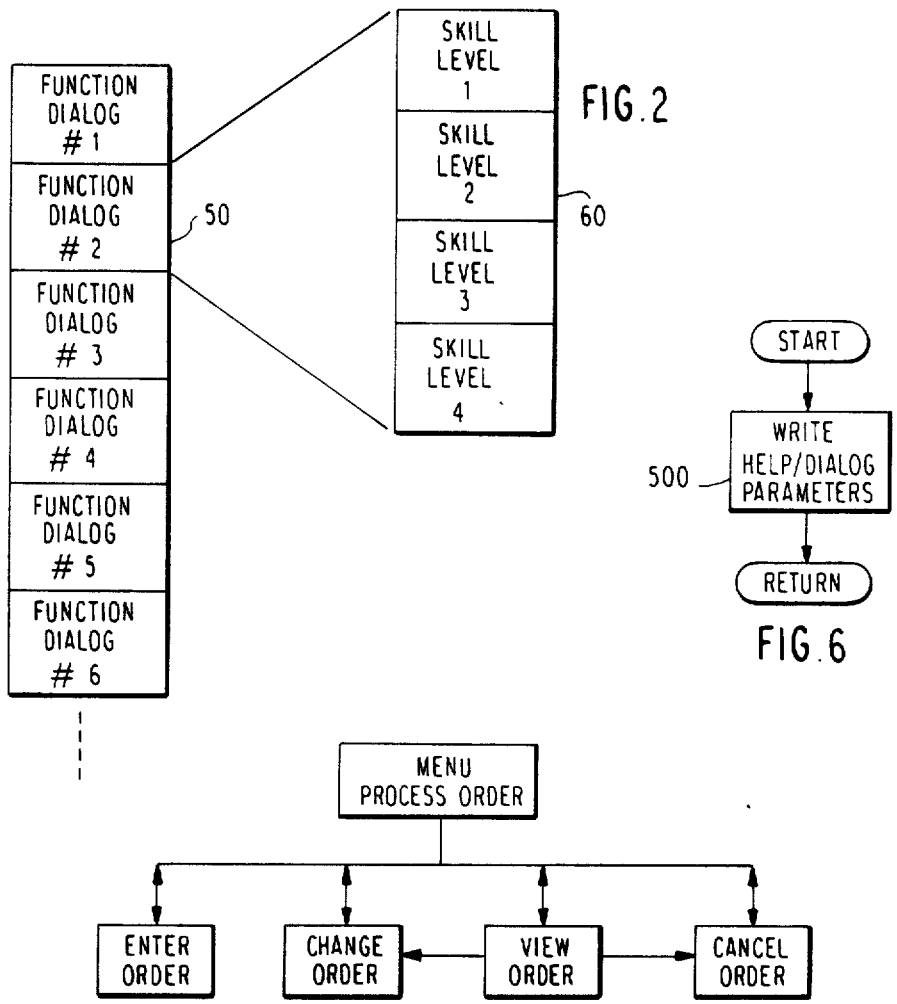

METHOD FOR AUTOMATICALLY ADJUSTING HELP INFORMATION DISPLAYED IN AN ONLINE INTERACTIVE SYSTEM

BACKGROUND OF THE INVENTION

1. Field of the Invention

The present invention generally relates to interactive data processing systems, and more particularly to a technique which provides a help/dialog function that presents information to a user based on the user's experience level with the interactive system. This approach allows a user to easily learn an application and avoid the burdensome overhead of too much help/dialog information after a degree of familiarity is achieved.

2. Description of the Prior Art

The change from centralized, batch operation of computer systems to distributed, interactive usage means more users are directly involved in using these systems. Moreover, computers are becoming more heterogeneous as the usage of computers spreads. The level of experience with or knowledge of computers by the users varies widely. More and more, the use of a computer or data processing system is by nonprofessionals in the data processing arts, and it is therefore important that the system be made "user-friendly" to facilitate ease of learning, as well as proper data entry and processing. However, as users repeatedly use a computer program, hereinafter referred to as an application, and reach a greater level of skill or proficiency with it, they require less and less help/dialog information. As used herein, the skill level of the user refers to a particular user's familiarity with a specific application or system as opposed to the user's skill in the field that the system addresses, such as banking, accounting or the like.

"User-friendly" systems have typically adopted a display screen "panel" or help/dialog approach which gives the user a choice of several options to perform and/or blanks to fill in. The blanks correspond to data fields, and these data fields have constraints on the type of characters that will be accepted, the length of the field, the compatibility of one entry with another, and so forth. A good prior art approach to the problem of prompts for data entry is found in U.S. Pat. No. 4,500,964, to Nickle, issued Feb. 19, 1985. The Nickle system provides operator information on errors made in entering information interactively. However, it is also necessary to provide the user with help/dialogs that clarify what each data entry screen requires. As the skill level of the user increases, the help/dialog information may become clumsy and burdensome and it would be beneficial to be able to limit it. However, if a person does not use an application for a period of time, the full help/dialog information may become important again.

Prior art techniques which are concerned with guiding a user through the proper entry of information into a system include the system described in U.S. Pat. No. 4,479,197, to Haag et al., issued Oct. 23, 1984. The Haag et al. patent discloses a system which allows the operator to select the modes of operation. At the highest level of control, the user can select which panel is of interest. The selected panel displays mode selection fields from which a selection can be made. The selected modes are linked in a cyclic order so that repeated activation of the field select key will cause the modes to be cycled through their linked sequence. The Haag et al. patent is specifically directed to logic state analyzers.

Another example is described in U.S. Pat. No. 4,308,582, to Berger, issued Dec. 29, 1981. The Berger patent discloses a precursory set-up for a word processor in which the user is presented with a list of acceptable functions that the word processor can perform. After the user selects a desired function, the control system automatically builds a list of control parameters for executing the selected functions and presents these control parameters to the user.

Users' needs change over time as they gain experience in the use of an application program. "Helpful" information may be helpful to the novice but may frustrate and slow the more experienced user. What is needed is a system supplement to the traditional help facility where the user receives helpful information by requesting it and yet does not detract from the expedient use of the application as the user gains experience in its use.

SUMMARY OF THE INVENTION

It is therefore an object of the present invention to provide a technique to help a user of an interactive computer or data processing system with help/dialog information based on the skill level or familiarity of the individual with a particular application.

It is another object of the invention to provide a technique for tracking user learning in each functional area of an application and decrease the amount of help/dialog information presented to the user as learning progresses.

It is another object of the invention to provide a technique for tracking the last date of usage of a functional area of an application and returning the user to the most basic help/dialog information upon determining a lack of usage of the application for an extended period of time.

The foregoing objects of the invention are accomplished by providing a supplement to the conventional help/dialog facility, comprising a complementary function that limits the amount of information presented based on the skill level of the individual as tracked by the number of times the user has been through the help/dialog for a particular functional area. As the user exceeds a user defined threshold for any functional area, the help/dialog information presented is reduced and the number of times through the help/dialog is reset. Additionally, an elapsed day count is kept to track the number of days between usages of a functional area. If a user defined threshold is exceeded, the help/dialog information is returned to complete help/dialog information.

The user is always in control of the amount of help he or she receives. For example, whenever user-set thresholds are exceeded, the user is notified and has the option of continuing with the previous level of help/dialog information. Addtionally, the user has the option at any time to change the level of help/dialog information or the user-set thresholds. If the user reduces the amount of help presented or the system has automatically reduced the amount of help due to exceeding a user-set threshold, the user is still able to access more help through the help facility.

BRIEF DESCRIPTION OF THE DRAWINGS

The foregoing and other objects, aspects and advantages of the invention will be better understood from the following detailed description of a preferred embodiment with reference to the drawings, in which:

FIG. 1 is a diagram illustrating the help/dialog information data structure;

FIG. 2 is a memory map of the help/dialog data residing on secondary storage;

FIG. 5 is a block diagram of a sample navigational help/dialog sequence; and

FIG. 6 is a flow diagram showing the termination process of the help/dialog routine.

DETAILED DESCRIPTION OF THE PREFERRED EMBODIMENT OF THE INVENTION

Figure 3:
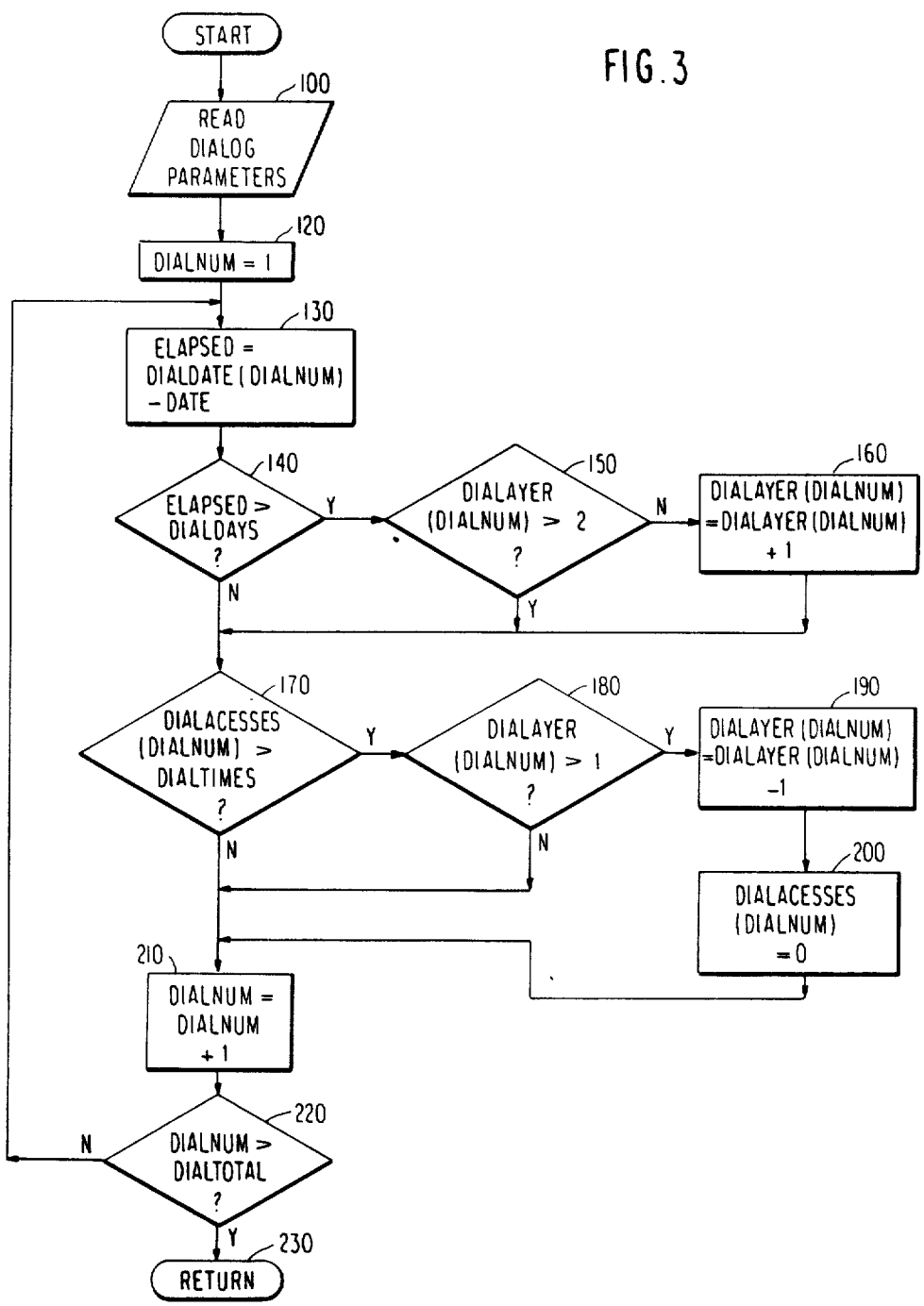
FIG. 3 is a flow diagram showing the help/dialog initialization process.

The invention is a technique which displays instructional information to the user of an interactive computer or data processing system based on the user's skill level with a particular application. The invention makes use of layers of help/dialog displays to guide a user through an application. The layers may range from very detailed information on every aspect of the function for the lowest skill level of a novice user to a subset of the detailed information that only provides summary information or field headings for the familiar, skilled user. The layers of help/dialog information might include, for example, navigational, keyboard, task, panel or field application information. By "navigational" information, what is meant is information pertaining to the manner in which one accesses various functions of an application. The help/dialogs are arranged by functional components of the application. The functional components include each of the panels of the application and the associated instructional information for the function. For example, if the topics mentioned above had associated helpful information provided, during the first use of an application, the user would first be shown the application or system overview information, the navigational and command information, and then keyboard usage information. The application or system overview might describe the purpose of the application or system, what it can be used to do, the parts of the application or system, and so forth. The navigational and command information might include information on a "starter" set of basic commands; e.g., the actions that are taken and the navigational information associated with the commands. For instance, "END" might mean the data is saved and the previous menu is re-displayed. The keyboard information might describe how specific keys could be used in the application or how to customize function keys. Then directional guidance would be displayed to assist the user through the application. As the user selected a task or function, information about that task or function might be displayed that assisted the user in completing it correctly. Lists of valid options might be displayed, for instance.

Examples of helpful information that might be displayed for different layers follows. In some systems, novice users might need general information about a panel; i.e., an overview, an explanation of what the panel is used for, or a list of possible actions that could be taken from the panel. Specific detailed information about a data entry field, such as the expected format, list of valid values or cross-field interdependencies, might be helpful at a field level. Explanations about menu items might be shown as the user moves a cursor to the item. Similarly, additional information about a message, information about what to do, for example, is often helpful. This type of additional information can be displayed without the novice user having to request it.

After the user had been through the application a few times, which could only be once depending on the complexity of the application, the user would understand the application or system overview information and would no longer need or want it displayed. The user-set thresholds having been met, the application or system overview information would not be shown, unless requested via the regular help facility.

Similarly, after using the application, the user would probably understand what the basic commands mean and would not need or want as much information displayed. The user-set thresholds for commands and navigational information having been met, this criteria could be different than for the application or system information, the command/navigational information could either (b 1) not be shown unless requested via the traditional help facility or (2) be shown in a summarized format.

Similarly, for any topic, as a threshold is reached and all criteria for reduction are met, the amount of information displayed automatically to help the user through an application can be decreased. For some topics, several panels of helpful information may be appropriate. The application overview is one such topic. For other topics, one panel may be optimal. For other topics, a window may suffice. As the amount of accompanying information needed diminishes, the amount shown can be decreased, as appropriate, from multiple panels, to one panel or scrollable window, to a smaller window, to nothing. The topics to be addressed should be decided by system designers based on their knowledge of the application and its targeted users. The decision on how to limit the instructional information displayed for each topic is based on the nature and complexity of the topic and on the characteristics of the users. Some topics of information might be limited based on topic alone. For instance, an overview of the application is typically of interest only the first or first few times through an application.

To control the amount of instructional/helpful information shown, users may be classified into levels of familiarity with the application. The number of levels supported again depends on the type of application and the diversity of users. Two to five levels would probably be adequate for most topics.

Besides decreasing the amount of information displayed, the content may vary as the user becomes familiar with a topic. For instance, the navigational and command information could change from the basic "starter" set to commands and navigational techniques for the more experienced user. "Fast" paths or command strings are examples of these techniques.

Specific detailed information about a data entry field may continue to be helpful well past the novice stage and may also depend on the user's knowledge in the field of knowledge which the application supports. Regardless of the topics of information selected for which helpful information will be displayed or the number of levels of familiarity with the application that are supported, an appropriate level of detail about the chosen topics can be displayed for a given class of user.

At the most detailed level, the user is presented with details of each data entry field on the screen as the cursor is moved into the data entry field as in the example below:

| Customer Order Part Number Help | |
|---|---|
| FULL EXPLANATION | |
| Part Number: | Alphanumeric Field of Up to Eight Characters. Uniquely Identifies Each Part. To Obtain A List of Valid Part Numbers, Press F2. |

The invention is designed to monitor the usage of the various functional components of the help/dialogs. As the usage of a particular function increases past a user-set threshold, the information presented with a panel is limited to the most pertinent details as in the example below:

| Customer Order Part Number Help | |
|---|---|
| SUMMARY EXPLANATION | |
| Part Number: | Eight Character Alphanumeric |

If more information is necessary, the user can request additional help.

Additional keyboard help/dialog information is displayed as in the example below:

SAMPLE KEYBOARD HELP

The left arrow key moves the cursor towards the left of the screen.

The right arrow key moves the cursor towards the right of the screen.

The up arrow key moves the cursor towards the top of the screen.

The down arrow key moves the cursor towards the bottom of the screen.

The Enter key tells the system to accept the current input and continue.

Task level help/dialog information such as how to enter an order is displayed as in the example below:

| Customer Order Entry Task Help |
|---|
| Enter a valid name. (Press F2 for List.) The address information is retrieved from the files and presented for your reveiw in the spaces provided. On the Part Number display, enter the first part number to be ordered. (Press F2 for List.) The description of the part is retrieved and presented on the display for your review. Then enter the Quantity of the Part to order. Continue to enter part numbers and quantities until the Customer's request if filled. Then Press F4 to process the order or Press F3 to Quit the processing without saving. |

This information is designed to describe the specifics of each function that the system performs.

A panel level help/dialog information is presented to guide the user through the use of a panel. An example of panel level help/dialog information is given below:

PANEL LEVEL HELP

Customer Name and Address are both required.
Enter the customer's account number and Press Enter to retrieve both the customer name and address.
Enter the customer name and press Enter to retrieve the customer address of an established customer.
Enter the name and address of a new customer. An account number will be assigned as you continue to the next panel.

Field level help may also be available.

The limitation process progresses according to the designation of each block of help/dialog information stored sequentially on a storage medium. The blocks are variable length records with a descriptive header. The data structure of a block of help/dialog information is shown in FIG. 1. In that figure, the data structure includes a 6-byte header, the first two bytes indicate the number of bytes of help/dialog information after the header. The functional component with which this help/dialog is associated is indicated in the next two bytes 10. The final two bytes 20 of the header record are dedicated to the skill level of the user. The help/dialog information 30 directly follows the header information.

The data structure shown in FIG. 1 is used by the programmer to set up the help/dialog to completely describe the function. The programmer assigns a functional help/dialog number 10 to the information 30. Then the programmer assigns a skill level 20 number and enters the help/dialog information 30. The skill level number 20 is the lowest skill level of a user that should view this information. The information 30 is then entered and the number of bytes of information 5 is calculated.

Blocks of help/dialog information are distributed on secondary storage as shown in FIG. 2. FIG. 2 depicts the sequential storage of the help/dialogs in functional order. Each of the functional help/dialogs consists of a plurality of blocks of help/dialog information as shown at 50 and 60. The blocks are sorted by function help/dialogs in descending order. Function help/dialog number two is depicted at 50. The blocks of information contained in 50 are depicted at 60. These blocks are sorted in descending skill level. It will be apparent to one of ordinary skill in the data processing art how to traverse the data structures laid out in FIGS. 1 and 2 and obtain information based on function help/dialog number 10 and skill level 20.

A typical flow of the application is illustrated in FIG. 3 to which reference is now made. The process begins in input data block 100 by reading in the help/dialog parameters. These parameters reside in a sequential flat file on a storage medium. The parameters are listed below with the functions that they perform:

(1) Dialaccesses—An integer array of numbers indicating for each help/dialog, the number of times the particular help/dialog has been viewed by the user.

(2) Dialdates—An integer array containing the last date the particular help/dialog was viewed by the user.

(3) Dialayer—An integer array indicating the current help/dialog layer for the user for each help/dialog.

(4) Dialdays—How long the user would like to go before reverting back to more detailed help/dialog information.

(5) Dialtimes—The number of times the user wants to see each layer of the help/dialog information.

(6) Dialtotal—The number of total help/dialogs (arranged functionally) for the application.

After this information is obtained from storage, dialnum (the function help/dialog pointer) is initialized to point to the first help/dialog as indicated in function block 120. Then a loop is entered to detect if any of the functional components has attained the elapsed time threshold or the accesses threshold. The loop's detailed operation begins with the calculation of the elapsed number of days based on the last date that the functional component was accessed and the current date of the application in function block 130. The number computed in 130 is compared to the user defined number of days before reverting back to a lower skill level in decision block 140. If the number of days is greater then the elapsed time threshold, decision block 150 is entered; if not, decision block 170 is entered. In decision block 150, the current skill layer is compared to assure that it will not violate the maximum skill level layer. Assuming that the skill level layer has not reached the highest level, the skill level layer is incremented to indicate to the program that more detailed help/dialog information is necessary for this help/dialog as indicated in function block 160. Flow of the application is returned to decision block 170 after incrementing the skill level or leaving the skill level at the maximum setting.

In decision block 170, the number of accesses of the help/dialog information is compared with the user specified threshold for the number of times to access a help/dialog before progressing to the next skill level. If the threshold has been met and the minimum skill level layer has not already been obtained as determined by the test in decision block 180, then the skill level layer is reduced in function block 190 to indicate to the application that the user is able to proceed with less help/dialog information and the number of accesses of the help/dialog information is reset to zero in function block 200 to restart the count determining progress to the next skill level.

The base of the loop is then entered at function block 210. The function help/dialog pointer is incremented in function block 210 and compared in decision block 220 to the total number of help/dialogs. If the threshold has not been reached, control is looped back to a new calculation of elapsed days for the next help/dialog at function block 130. If all the help/dialogs have been processed as determined by the test in decision block 220, then initialization processing is complete and control is returned to the application.

Figure 4:
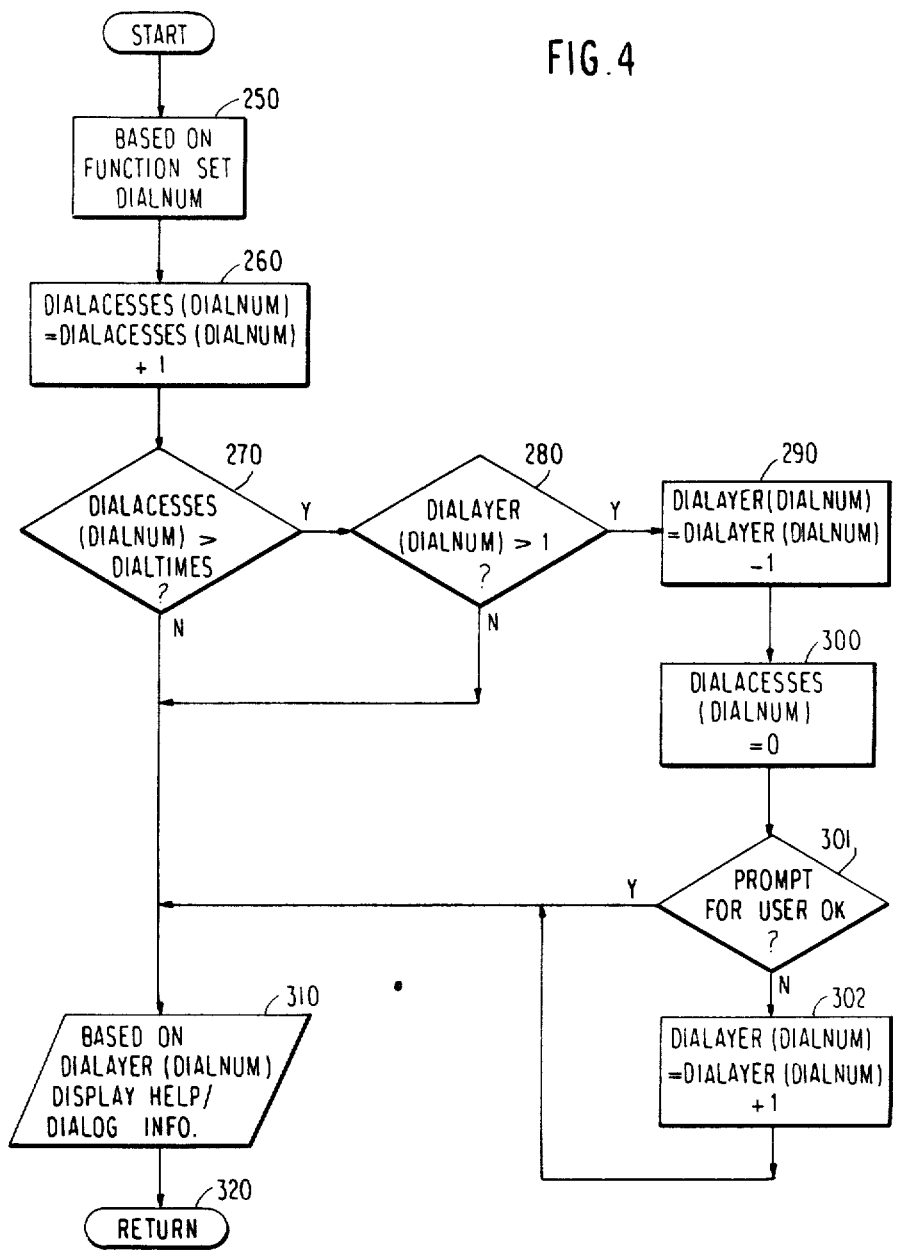
FIG. 4 is a flow diagram showing the help/dialog process.

When the application is executing and the user presses the help/dialog key, the steps presented in FIG. 4 are executed. The application keeps a variable for tracking which functional component the user is executing. This variable is dialnum as indicated in function block 250. Dialnum corresponds to the function help/dialog 10 that is shown in FIG. 1. Each time help information is requested for a particular function help/dialog, the application increments the help/dialog accesses information in function block 260, and checks to see if the user has passed a user specified threshold in decision block 270. If the threshold has been attained and the skill level is not already at the minimum level as determined by the test in decision block 280, the layer is decremented in function block 290 to the next skill level layer, and the number of accesses for the functional help/dialog is reset to zero in function block 300. The purpose of the above mentioned test is to track the user's progression in the application. As the user becomes familiar with the information contained at one skill level of help/dialogs, a condensed version most likely will be sufficient when the user needs help. The user is prompted for approval of any change of the help/dialog information as shown in decision block 301. If the user does not approve the change, the layer of help/dialog information is reset to the previous level as shown in function block 302. Following the approval phase described above, the help/dialog information is displayed as indicated in output block 310, and control is returned to the application as shown in 320.

The user is also given the capability of dynamically resetting the skill level. If the user presses the help/dialog key and then presses the skill level that is desired, the application sets the skill level to the user specified setting and the information for the skill level entered is presented.

Alternatively, the help/dialog information can be provided automatically as a new user uses the application. The amount of information shown decreases according to the user-set thresholds for the application topics. If additional help is needed, the user can request it through a help facility.

To summarize, the information making up the text of the message is obtained by using the help function dialog 10 based on the current active display to get to the function help/dialog blocks 50 on the secondary storage or in memory. Then the current skill level 20 entry for the help/dialog function help/dialog is used to search for the first entry that corresponds to the skill level. The help/dialog information is displayed one block at a time as the user progresses through the application. The associated help/dialog is displayed for the topic being used. The user can return to the application without additional help information at any time by pressing the exit key.

To further illustrate the procedure, consider the following help/dialog which requires a user to key in certain basic data for a customer order entry application:

| CUSTOMER ORDER ENTRY APPLICATION | |
|---|---|
| NAME | ABC __ |
| ADDRESS | |
| CITY | Please enter the name of the company placing this order. |
| ZIP CODE | |

Thus, in the example above, the user is guided into entering the name of the company placing the order. As the user moves from entry field to entry field, similar information is displayed to help the user enter the correct information. Should the user require more information, the help/dialog key is pressed to indicate that more information is desired. The default box of help/dialog information for each entry field will not be displayed unless required in the higher skill level.

FIG. 5 shows, in block diagram form, a sample navigational help information sequence. Note that navigational help may show navigational flow possibilities, as in FIG. 5, or may describe the naviagational commands. As an example of a navigational command, FORWARD is a scrolling action that displays information below the information currently being displayed.

In FIG. 6 the termination processing steps are presented. The write help/dialog parameters step 500 involves the transfer of the help/dialog parameter information discussed above to a storage medium. This information includes Dialaccesses, Dialdates, Dialayer, Dialdays, Dialtimes and Dialtotal. This information is written in a sequential file on secondary storage. After the help/dialog parameters have been written, control is returned to the application for termination processing.

The user is also given the capability to dynamically override the skill level at any time to obtain more help/dialog information. The user is presented with a prompt to enter the skill level desired. The entered value is compared to acceptable values and overrides the previous or current skill level.

In summary, the invention provides a data base of help/dialog messages which may be uniquely addressed by function and skill level. The application does not need to be aware of the number of help/dialog messages available for each help/dialog function. The application tracks the amount of time the user has been away and after a predetermined amount of time resets the skill level to provide a more detailed information presentation. This allows someone who has been away from an application to be lead through the help/dialog information and become re-familiarized with the application again. In addition, the user's progress through an application is tracked, and once the user has been through the help/dialog information for any functional component of the application a preset number of times, the user is moved to a higher skill level and is unburdened from some of the help/dialog information. It is possible to extend the teaching of this invention to multi-lingual data entry systems where a user may substitute different language messages in the defined data structures discussed above.

Although a preferred embodiment of the invention has been described, those skilled in the art will recognize that this invention may be practiced with modification to meet particular applications within the spirit and scope of the appended claims.

Having thus described out invention, what we claim as new and desire to secure by Letters Patent is as follows:

1. In a data processing application having a plurality of functional components and comprising a plurality of displays at least some of which include prompts for user input, a storage and a data structure, a method of presenting a different level of help/dialog for each said functional component to different users during execution of said data processing application comprising computer performed steps of:

storing on said storage a plurality of levels of help/dialog for each said functional component for which there is a display including prompts for user input, said levels ranging from more detailed for users with minimal experience with said data processing application to less detailed or different information for users with greater experience with said data processing application;

maintaining a record in said data structure on said storage of a number of times each said functional component has been accessed by each user;

detecting which one of said functional components is active based on what display is operative;

determining which one of said levels of the dialog for said operative display including prompts for user input should be displayed based on the number of times said user has accessed said functional component and which one of said levels of help should be displayed in response to a user request for help based on the number of times said user has accessed said functional component; and activating a display of the help/dialog for said operative display.

2. The method according to claim 1 wherein the step of determining is performed by the steps of:

comparing the number of times one of said plurality of functional components is accessed to a predetermined threshold; and when said predetermined threshold is exceeded, displaying a help/dialog which is less detailed.

3. The method according to claim 2 further comprising the steps of:

maintaining a record in said data structure of how many days have passed since one of said plurality functional components has been accessed on said storage; and displaying a help/dialog which is more detailed after a predetermined number of days has passed.

4. The method according to claim 2 further comprising the step of deactivating the display of the dialog when the number of times one of said plurality functional components is accessed exceeds a second predetermined threshold.

5. The method according to claim 4 further comprising the steps of:

maintaining a record in said data structure of how many days have passed since said functional component has been accessed on said structure; and reactivating said dialog after said record in said data structure of how many days have passed has reached a third predetermined threshold.

6. The method according to claim 2 further comprising the step of responding to a user command and deactivating the display of the help dialog.

7. The method according to claim 1 further comprising the step of responding to a user command and modifying the help/dialog stored on said storage.

* * * * *